(No Model.)
J. FOWLER.
COMBINED BAIT AND DRINKING CUP.
No. 457,642. Patented Aug. 11, 1891.
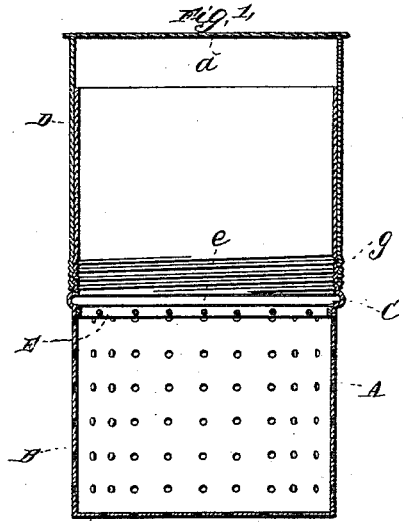
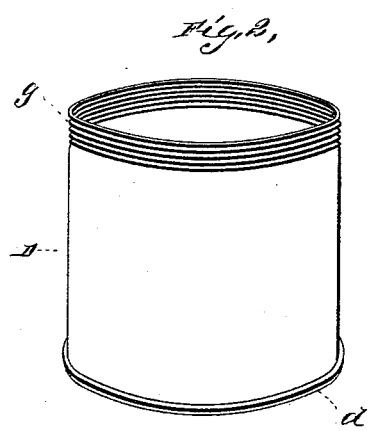
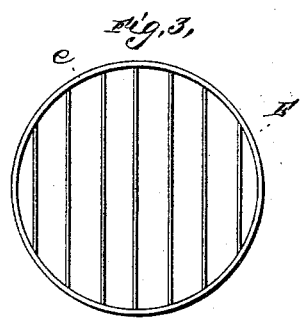
Witnesses
Chas L. Taylor
Phil E. Masi.
Inventor
Jno. Fowler
by E. W. Anderson
his Attorney

UNITED STATES PATENT OFFICE.

JOHN FOWLER, OF LOUISVILLE, KENTUCKY.

COMBINED BAIT AND DRINKING CUP.

SPECIFICATION forming part of Letters Patent No. 457,642, dated August 11, 1891.

Application filed October 31, 1890. Serial No. 369,897. (No model.)

*To all whom it may concern:*

Be it known that I, JOHN FOWLER, a citizen of the United States, and a resident of Louisville, in the county of Jefferson and State of Kentucky, have invented certain new and useful Improvements in a Combined Bait-Preserving and Drinking Cup; and I do declare the following to be a full, clear, and exact description of the invention, such as will enable others skilled in the art to which it appertains to make and use the same, reference being had to the accompanying drawings, and to letters of reference marked thereon, which form a part of this specification.

Figure 1 of the drawings is a sectional view inverted. Fig. 2 is a perspective view of the cup. Fig. 3 is a detail view.

This invention has relation to combined bait-preserving and drinking cups; and it consists of the novel construction and arrangements of parts as hereinafter set forth.

In the accompanying drawings, the letter A indicates a receptacle of cylindrical, oval, or other desirable form, which is open at one end and perforated for about half its surface at the opposite end B. The receptacle A is surrounded between the perforated and the open end with a bead C, which is designed to serve as a rest for the rim of a cup or cap D, which fits over and around the opening of said receptacle. This cup may be slipped over the receptacle in the usual manner of capping boxes, or it may be provided with threads $g$, struck up from the material composing the device and made to engage corresponding threads in the perforated receptacle when of cylindrical form.

When the device is used as a bait cup or holder, the bottom $d$ of the cup portion becomes the base upon which the whole rests. Water is then introduced with the bait to preserve it and prevent sweating. If at any time it should become necessary to drain off a superabundance of water, the device is reversed, in order that the discharge of fluid may take place through the perforations, the latter also serving as means for ventilation.

The cup, when desired, may be used as a drinking-vessel without interfering with the bait, which remains within the receptacle A.

E is a removable light frame provided with transverse bars $e$, and is adapted to fit tightly within the perforated receptacle above the perforated portion for the purpose of partially exposing the worms or other bait, which, when the cup is removed and the perforated receptacle reversed, may be taken out through the bars from below.

These bait-vessels are designed to be made of different sizes, and are adapted to be carried in the pocket and to serve for different kinds of bait.

What I claim as my invention is—

1. In a receptacle for preserving and transporting bait, the combination, with a receptacle A, provided with perforations at one end and open at the other end, of a removable grating within said case, and the cap or cup fitting over the latter, substantially as shown and specified.

2. The bait-holder and drinking-cup combined, comprising the receptacle A, having its body portion perforated at one end and threaded at the other, and the cup or cap D, having a corresponding thread for engaging the thread of the receptacle, substantially as specified.

In testimony whereof I affix my signature in presence of two witnesses.

JOHN FOWLER.

Witnesses:
OLIVER LUCAS,
WM. INGRAM.